July 25, 1944. G. K. NEWELL 2,354,604
DISK BRAKE CONSTRUCTION
Filed April 1, 1942
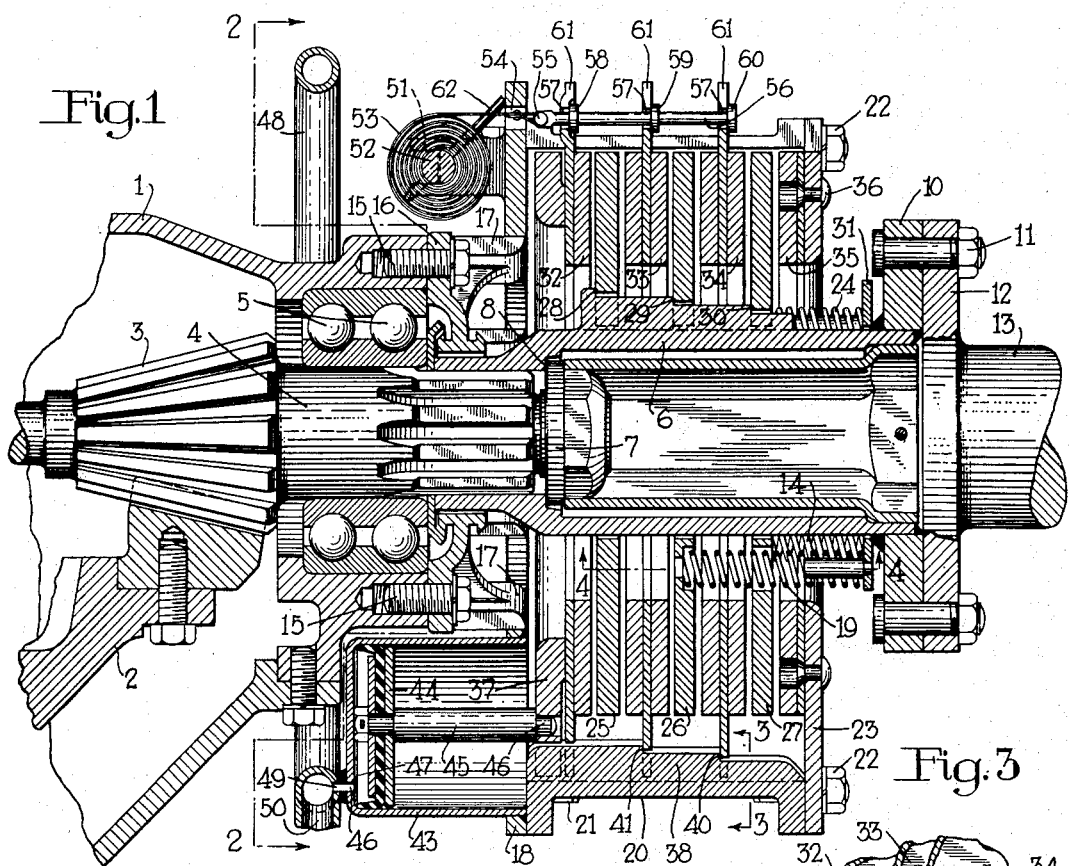
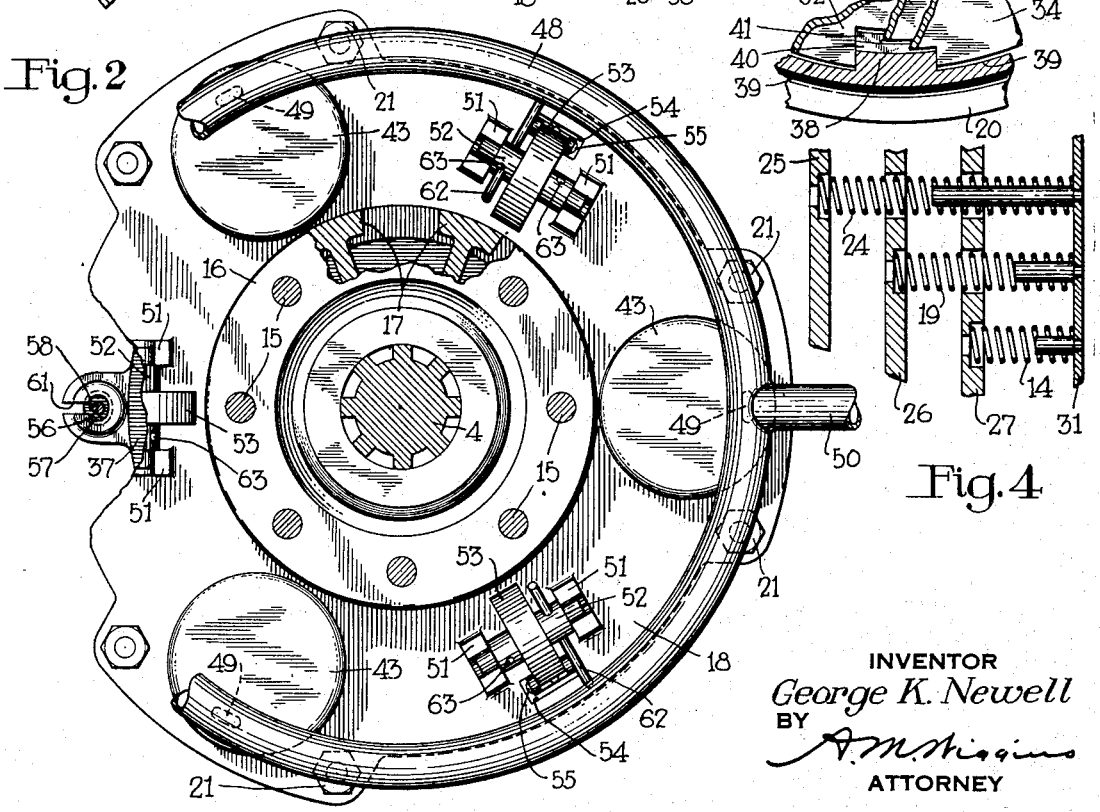
INVENTOR
George K. Newell
BY
A. M. Higgins
ATTORNEY Patented July 25, 1944

2,354,604

UNITED STATES PATENT OFFICE 2,354,604

DISK BRAKE CONSTRUCTION

George K. Newell, near Pitcairn, Pa., assignor to The Westinghouse Air Brake Company, Wilmerding, Pa., a corporation of Pennsylvania Application April 1, 1942, Serial No. 437,115

16 Claims. (Cl. 188—72)

This invention relates to disk brake construction of the type embodying interleaved rotatable and non-rotatable braking elements or disks for frictionally engaging each other to effect braking of a vehicle wheel or other member to be braked and more particularly to means for disengaging from each other the disks of a brake mechanism for effecting a release of brakes.

One object of the invention is the provision of novel brake releasing means for disengaging the brake elements of a disk brake mechanism.

In disk brake mechanism, helical type coil springs arranged with their axes parallel to the axes of the braking disks have usually been employed for moving the disks out of braking interengagement to their brake release positions. In certain structures the release springs have been located at one end of the pile of disks and each spring has been connected to all of the like disks in the pile while in certain other structures the springs have been in the form of individual springs for each brake disk. Such structures have operated as intended but each embodies certain limitations or undesirable characteristics which will now be discussed.

In the first place it is well understood that the space required for the installation and operation of a helical type coil spring is dependent upon its deflection or change in length in use. Now if such a spring is operatively connected to several axially movable elements for moving same from brake application positions to brake release positions, the deflection equals substantially the aggregate of the spacing of the several brake elements when in their release condition and therefore requires operating space which is not available in certain locations for disk brakes. This space limitation may be avoided by using individual springs for each brake element but such a structure in turn is somewhat objectionable on account of the relatively great number of springs required.

As an example, in the copending application of Joseph C. McCune, Serial No. 408,578, filed August 28, 1941, now Patent No. 2,326,960, Aug. 17, 1943, and assigned to the assignee of the present application, there is disclosed a multi-disk brake mechanism for a particular use requiring compactness. To obtain this compactness three individual release springs were employed for each brake stator making a total of nine springs for the three stators. Three springs, each of which would have been connected to all of the stators, could not have been used in this structure due to the relatively great space which would have been required for their deflection not being available in the particular location where it was desired to use this structure. Thus while this McCune structure is objectionable from the standpoint of the large number of springs, a structure using only one third the number of springs, each connected to all of the stators, is also objectionable at least in this one specific instance from the standpoint of compactness and utility.

Another object of the invention is therefore the provision of release means for the disks of a multi-disk brake mechanism which obviates the objections to both the release structures above described.

According to this object, I employ flat spiral springs, that is, springs of the type in which the coils are wound from a center around one another, in contrast to the coil type spiral spring in which the spring is wound in the form of a helix, for moving the disks to their release positions. The center of each of the flat spiral springs is fixed or anchored against movement while the outer end is connected to each of the several brake disks to be moved thereby limiting the number of these springs required to the minimum above described and overcoming the objections to the large number employed in a structure where individual springs are used for each disk such as disclosed in the above referred to application.

The deflection of a flat spiral spring is measured by the unwinding and winding up of the spring with a relatively small change in spring diameter, so that such springs require only a relatively small space for installation and operation and thus permit the design of a structure substantially as compact as that disclosed in the above referred to McCune application without however the above described objection thereto.

Other objects and advantages will be apparent from the following more detailed description of the invention.

In the accompanying drawing, Fig. 1 is a sectional view taken horizontally through a disk brake mechanism embodying the invention; Fig. 2 is a sectional view taken substantially on the line 2—2 in Fig. 1; Fig. 3 is a sectional view taken on the line 3—3 in Fig. 1; and Fig. 4 is a sectional view of certain parts of the brake mechanism shown in Fig. 1 and taken substantially on the line 4—4 in Fig. 1.

Description

In the drawing the reference numeral 1 indicates a portion of a driving axle housing of a vehicle which contains an axle (not shown) adapted to be driven by a ring gear 2 contained in said housing for propelling the vehicle. The ring gear 2 is in mesh with a driving pinion 3 provided on one end of a shaft 4 which is supported in a ball bearing 5 carried by the housing. One end of a driving sleeve 6 is splined to the end of pinion shaft 4 outside of the housing 1 and is secured thereto by a washer 7 which is clamped by a nut secured to shaft 4 against an internal shoulder 8 provided in sleeve 6. The opposite end of the driving sleeve 6 is secured by welding to a ring or flange 10 which is connected by bolts 11 to a collar or flange 12 provided on one end of a propeller shaft 13. The propeller shaft 13 may be connected to any suitable prime mover, such as an internal combustion engine which may be used for propelling the vehicle, and as will be apparent, driving power applied to said shaft will be transmitted through sleeve 6, pinion shaft 4, gears 3 and 2 to the dirving axle and thereby the wheels connected to said axle for propelling the vehicle.

Secured to the axle housing 1 by bolts 15 is a cover 16 which engages the outer end of ball bearing 5 for holding same in place. The cover 16 is provided with a plurality of outwardly extending supporting lugs or ribs 17 which, at their outer ends, are connected to and support a circular plate or ring 18 arranged in coaxial relation with the driving sleeve 6. Three spacer elements 20, equally spaced from each other around the sleeve 6, have one end secured by bolts 21 to the right-hand face of ring 18. The opposite ends of the elements 20 are secured by bolts 22 to the left-hand face of a ring 23.

Three annular disk-like rotating brake elements or rotors 25, 26, and 27 disposed between the rings 18 and 23 encircle the driving sleeve 6 in the space between but not in contact with the spacer elements 20. These brake elements are splined to the sleeve 6 for rotation therewith and are movable axially relative thereto in the direction away from the axle housing 1 to effect braking of the vehicle and in the opposite direction to brake release positions to allow propulsion or coasting of the vehicle.

The brake release positions of the three rotors 25, 26, and 27 are defined by contact with shoulders 28, 29, and 30, respectively, provided on the sleeve 6. For moving the brake rotors to their release positions several like sets of springs are provided which are spaced from each other around the sleeve 6 and supported at one end by a ring 31. Only a portion of these springs is shown in Fig. 1, but in Fig. 4 is shown one complete set which comprises a spring 14 acting on the rotor 27, a spring 19 freely extending through a suitable bore in rotor 27 and acting on the rotor 26, and a third spring 24 which freely extends through suitable openings in the rotors 27 and 26 and acts on the rotor 25. All of these springs are under compression and it will be apparent that they are effective to urge the several rotors into contact with their respective release position defining shoulders 28 to 30 on sleeve 6, as shown in the drawing.

A plurality of non-rotatable brake elements or stators 32, 33, 34 and 35 are interleaved with the rotors 25 to 27 in coaxial relation therewith and with the stator 35 disposed at one end of the pile in contact with the ring 23 and with the stator 32 disposed at the opposite end of the pile. The stator 35 is rigidly secured to the ring 23 by rivets 36 and is thus fixed against axial movement while all of the other stators are movable axially. The outer face of the stator 32 is engaged by a pressure ring 37.

The several spacer elements 20 are provided either side of a central tongue 38 extending longitudinally thereof with an arcuate surface 39 formed concentric with the axis of the driving sleeve 6 and extending parallel thereto. The outer peripheries of the pressure ring 37 and stators 32, 33, and 34 are arranged to substantially contact these surfaces for supporting said ring and stators in coaxial relation with the rotors and providing also for axial movement of said stators relative to the driving sleeve 6 either in the direction of or away from the fixed stator 35.

The tongue 38 projecting inwardly from each spacer 20 extends into slots provided in the outer edges of the pressure ring 37 and stators 32, 33, and 34 for holding said ring and stators against rotation and each tongue is formed with three steps stepped inwardly in a direction away from the ring 23 to provide shoulders 40 and 41 for engagement by the stators 34 and 33, respectively, to define their brake release positions in which they are shown.

The ring 18 is provided with three bores equally spaced from each other around the ring and extending parallel to the axis of the ring, and secured by welding in each of these bores is the open end of a brake cylinder 43 which projects from the ring in the direction toward the axle housing 1. A brake cylinder piston 44 is slidably mounted in each of the cylinders 43 and is provided with a piston rod 45, the outer end of which engages the pressure ring 37. The ring 37 is provided with bores smaller than the diameter of rods 45 to receive reduced end portions 46 of the rods for supporting same and thereby the pistons 44 in working relation to the cylinders 43. The left-hand end of each piston 44 is arranged to engage the closed end of the cylinder 43 to thereby define, through the medium of rod 45 and ring 37, the brake release position of the stator 32.

Each brake cylinder 43 is provided with a port 46 which opens to a pressure chamber 47 provided at the face of piston 44 opposite that from which the rod 45 projects. A circular pipe 48 encircles the axle housing 1 outside the portion containing the ball bearing 5 and is welded to each of the brake cylinders 43 over the port 46 and is provided with a port 49 which registers with the port 46 to thereby connect the several pressure chambers 47 to the interior of the pipe. The pipe 48 is in turn connected to a pipe 50 through which fluid under pressure may be supplied to and released from the several brake cylinder pressure chambers 47 for controlling the brakes.

The brake mechanism parts as so far described may be identical to corresponding parts of a brake mechanism fully disclosed in the aforementioned copending application of Joseph C. McCune, in view of which a further and more detained description of the structure thereof is not deemed essential in this application.

The invention comprises means for moving brake elements to their release positions, and for the purpose of illustration, is applied in the present embodiment to the stators 34, 33, and 32 and thereby to the ring 37 and brake cylinder piston 44, it being recalled from the above description that the release positions of the stators 34 and 33 are defined by contact with shoulders 40 and 41 on the spacers 20, while the release position of the stator 32 is defined by the position in which the pressure ring 37 is stopped by the brake cylinder pistons 44 when said pistons engage the closed end of the brake cylinders 43.

According to the invention the ring 18 is provided between each two brake cylinders 43 with two spaced lugs 51 extending outwardly from the left-hand face thereof. Each of these lugs is provided at its end with a jaw and in the jaws of these lugs between each two brake cylinders 43 are journaled the opposite ends of a torsion pin 52 having a central enlarged section for engagement with the inner faces of the lugs to limit endwise movement of the pin.

Each torsion pin 52 extends through the center of, and is encircled by, the coils of a flat spiral spring 53, the inner end of which is suitably anchored to the pin. The outer end of each of the spiral springs 53 extends through an opening 54 provided in the ring 18 at a greater distance from the axes of the several stators than the braking faces of the stators and is provided with a loop which encircles a pin 55 carried by a release rod 56.

Each of the release rods 56 extends parallel to the axis of the brake elements through aligned openings 57 provided in the stators 32, 33, and 34 outside of the braking faces thereof. Each of the rods 56 carries three washers 58, 59, and 60 disposed to engage the sides of stators 32 to 34, respectively, opposite the sides adjacent the spring 53. These washers are rigidly secured to each rod in the same spaced relation as the stators 32 to 34 when in their brake release positions as defined by engagement of the brake cylinder pistons 47 with the ends of the brake cylinders 43 and by shoulders 41 and 40, respectively.

Each opening 57 in the stators is connected by a slot 61 to the outer edge of the stators to permit insertion of the rod 56 from the edge of the stators into said opening. In one of the stators, such as the stator 32, the openings 57 may be provided at the bottom of recesses pressed into the stator for receiving the washers 58, as shown in Fig. 1, these recesses and washers being arranged to cooperate to hold the rods 56 from becoming disengaged from the stators by falling or working out of the openings 57 and slots 61.

After each rod 56 has been applied through the aligned slots 61 to openings 57 in the stators 32 to 34 as shown in Fig. 1, then by means of a pin 62 applied to a bore 63 through the torsion pins 52 the latter may be turned to wind up the torsion springs 53 to obtain a required or desired tension or force of the springs on the rods 56 for pulling the stator element 32, 33, and 34 to their release positions shown in Fig. 1, it being noted that this force from springs 53 must also be sufficient in this brake mechanism to move the pressure ring 37 and brake cylinder pistons 44 to their release positions. To facilitate winding of the spiral springs 43 the torsion pins 52 may be provided with more than one bore 63 as shown in Fig. 2, for the reception of a pin such as 62. When the proper or desired tension of the springs 53 has been obtained, the pin 62 in each torsion pin 52 may be allowed to turn back into contact with the ring 18 which will then securely hold the respective spring under the desired degree of tension.

*Operation*

In operation, let it be initially assumed that the brake cylinder pressure chambers 47 are devoid of fluid under pressure, under which condition all parts of the brake mechanism will occupy the release positions shown in Fig. 1, for reasons which will hereinafter be discussed.

If it is now desired to apply the brakes, fluid under pressure is supplied through the pipe 50 to the circular pipe 45 and through the ports 46 and 46 into the pressure chamber 47 of the brake cylinder devices. When a sufficient degree of pressure is thus obtained in chambers 47 on the brake cylinder pistons 44 to overcome the opposing force of torsion springs 53 applied to stator 32, said pistons start moving in the direction of the right-hand and move the pressure ring 37 and the stator 32 relative to the spacers 29 in the direction of and into contact with the rotor 26. Further movement of the brake cylinder pistons then effects further movement of the stator 32 and causes the rotor 26 to move in the direction of and into contact with the stator 33. In this manner as the pistons 44 continue to move toward the right-hand, all of the brake elements are moved first into contact with one and then another until the rotor 27 engages the fixed stator 35.

All of the brake elements being now in frictional interengagement, the stators create a drag on the rotors to a degree dependent upon the pressure of fluid acting on the brake cylinder pistons 44 and this drag effects a corresponding degree of braking of the drive sleeve 6 and thereby, through the gears 3 and 2, of the driving axle and wheels of the vehicle for either retarding or bringing the vehicle to a stop. The degree of braking thus obtained depends upon the force with which the several brake elements are pressed into inter-engagement and any desired degree may be attained by providing the proper pressure of fluid in the brake cylinder pressure chambers 47, as will be apparent.

It will be noted that as the several brake elements or disks are moved into braking engagement as just described, the initial movement of the stator element 32 is opposed by and causes a certain degree of winding up of the several flat spiral springs 53 and also causes movement of the washers 59 and 60 out of contact with the stators 33 and 34. As the stator element 32 continues to move under action of the brake cylinder pistons to its final braking position, a further winding up of coil springs 53 occurs, it being noted however that at no time with the brakes applied do the washers 59 and 60 contact the stators 33 and 34. In other words, all winding up of the coil springs 53 in effecting an application of brakes is attained by axial movement of the stator 32 and it should be noted that the degree of such movement equals the aggregate of the spaces between all of the rotors and stators when in their brake release positions as shown in Fig. 1.

In effecting an application of brakes the springs 14, 19, and 24 are compressed by movement of the rotors 27, 26, and 25, respectively, to their brake applying positions.

In order to release the brakes after an application, fluid under pressure is released from the pressure chambers 47 in the several brake cylinder devices 43. When this occurs, the several spiral springs 53 acting on the stator 32 return same and thereby the pressure ring 37 and brake cylinder pistons 44 to their release positions shown in the drawing and defined by contact between said pistons and the end of the brake cylinders 43. At the same time as the stator 32 is thus returned to its release position, the springs 14, 19, and 24 return the rotors 27, 29, and 25 to their release positions, and during such movement the washers 59 and 60 on the rods 58 move into contact with the stators 33 and 34 and pull same to their release positions defined by contact between the shoulders 41 and 48 on the spacers 28.

Summary

It will now be seen that the flat spiral springs 53 applied in the present embodiment of the invention to the stators of a disk brake mechanism are wound up and thus become reduced in diameter upon movement of the stators to effect an application of brakes, and as said stators are returned to their release positions under the tension of said spring to effect a release of brakes, the diameters of the springs become slightly enlarged. In other words, the diameter of the spiral springs 53 during operation of the brake mechanism changes, but the change is relatively small although providing a deflection of the springs which with a helical type coil spring would require a spring of relatively great length and therefore a much greater degree of space in a brake mechanism. The use of flat spiral springs 53 thus provide for obtaining a brake mechanism which is relatively compact and thus capable of use under circumstances which helical type coil springs would prohibit. Moveover, due to the relatively small change in size of the spiral flat springs 53 they are particularly adapted for the control of a plurality of brake elements, as will be readily apparent.

Having now described my invention, what I claim as new and desire to secure by Letters Patent, is:

1. A brake mechanism comprising in combination a relatively fixed member, a brake disk movable axially relative to said member to effect an application of brakes, and a plurality of flat spiral torsion springs arranged in spaced relation with respect to the periphery of said disk and each having one end anchored to said member and its other end connected to said brake element and operative to move said element relative to said member to effect a release of brakes.

2. A brake mechanism comprising in combination, a relatively fixed member, a brake disk carried by said member and movable axially in one direction to effect an application of brakes and in the opposite direction for effecting a release of brakes, means for moving said brake disk in one of its directions of movement, and a plurality of torsion springs having one end anchored to spaced portions of said member and the other end connected to said brake disk and operative to oppose movement of said brake disk by said means and to move said brake disk in the other direction of movement.

3. A brake mechanism comprising in combination, a relatively fixed member, a plurality of coaxially aligned brake elements movable axially in one direction into frictional interengagement to effect braking, and movable axially in the opposite direction into spaced apart relation to effect a release of brakes, means for moving said brake elements in one of said directions, flat spiral spring means carried by and having one end anchored to said member, and means connecting the other end of said spring means to said brake elements, the tension of said spring means being operative through the connecting means to move said brake elements in the other of said directions.

4. A brake mechanism comprising in combination a relatively fixed member, a plurality of axially aligned brake elements having brake release positions in which said elements are spaced from each other and being movable axially from said release positions into frictional interengagement to effect an application of brakes, spiral spring means carried by and having one end anchored to said fixed member, and means connecting the other end of said spring means to said brake elements for rendering said spring means effective to urge said brake elements to their respective release positions and providing for movement of said brake elements out of their release positions.

5. A brake mechanism comprising in combination, a relatively fixed member, a plurality of axially aligned brake elements having brake release positions in which said elements are arranged in spaced apart relation and being movable axially from said positions to effect an application of brakes, stops engageable by said brake elements for defining the release positions thereof, spiral spring means carried by and having one end anchored to said fixed member, and means connecting the opposite end of said spring means to said brake elements for rendering said spring means operative to urge said brake elements into contact with their respective stops, said spring means providing for movement of said elements out of said release positions to effect an application of brakes.

6. A brake mechanism comprising in combination, a relatively fixed member, a plurality of axially aligned brake elements having brake release positions in which said elements are arranged in spaced apart relation and being movable axially from said positions to effect an application of brakes, stops engageable by said brake elements for defining the release positions thereof, one or more flat spiral springs carried by and having one end anchored to said member, and means connecting the opposite end of each of said springs to each of said brake elements for rendering said springs effective to urge said brake elements into engagement with their respective stops, said springs providing for movement of said elements out of contact with said stops to effect an application of brakes.

7. A brake mechanism comprising in combination a relatively fixed member, a plurality of coaxially aligned brake elements movable in one direction to effect an application of brakes and movable in the opposite direction to brake release positions in which said elements are spaced from each other, spaced stop means engageable by said elements in said release positions for defining such positions, a plurality of release means associated with said brake elements and arranged to engage same when in said spaced apart relation for urging said brake elements into contact with said stop means, a flat spiral spring for each of said release means carried by and having one end anchored to said member, and means connecting the opposite end of each spiral spring to one of said release means for rendering the spring effective to urge the brake elements into contact with said stop means and providing for movement of said elements out of contact with said stop means.

8. A brake mechanism comprising in combination, an annular relatively fixed member, a plurality of coaxially aligned annular brake elements disposed at one side of said member and movable axially in one direction relative to said member to effect an application of brakes and in the opposite direction a release of brakes, a plurality of flat spiral springs spaced from each other around and having one end anchored to said member, and means connecting the other end of each of said springs to each of said brake elements, said springs being operative through the respective connecting means to move said brake elements in said opposite direction relative to said member.

9. A brake mechanism comprising in combination, an annular relatively fixed member, a plurality of coaxially aligned annular brake elements disposed at one side of said member and movable axially in one direction relative to said member to effect an application of brakes and in the opposite direction a release of brakes, a plurality of rods spaced apart from each other in a circle coaxial with said brake elements, means on each rod arranged to engage each brake element for moving the several brake elements in the direction for releasing the brakes upon movement of the respective rod in the same direction, a flat spiral spring for each rod carried by and having one end anchored to said fixed member, and means connecting the other end of said springs to the respective rods for rendering said springs operative to move said brake elements in said opposite direction for releasing the brakes.

10. A brake mechanism comprising in combination, an annular relatively fixed member, a plurality of coaxially aligned annular brake elements disposed at one side of said member and movable axially in one direction relative to said member to effect an application of brakes and in the opposite direction a release of brakes, a plurality of rods spaced apart from each other in a circle coaxial with said brake elements and extending in the direction parallel to the axis of said brake elements, each rod extending through aligned openings in the several brake elements, a release member secured to each rod for contact with each brake element for moving same in said opposite direction for releasing the brakes, and a flat spiral spring for each rod carried by and having one end anchored to said fixed member, and means connecting the opposite ends of said springs to the respective rods to thereby render said springs effective to actuate said rods for moving the brake elements in said opposite direction for releasing the brakes.

11. A brake mechanism comprising in combination, an annular relatively fixed member, a plurality of coaxially aligned annular brake elements disposed at one side of said member and movable axially in one direction relative to said member to effect an application of brakes and in the opposite direction a release of brakes, a plurality of rods spaced apart from each other in a circle coaxial with said brake elements and extending in the direction parallel to the axis of said brake elements, each rod extending through aligned openings in the several brake elements, a release member secured to each rod for contact with each brake element for moving same in said opposite direction for releasing the brakes, spring means carried by said fixed member and acting on said rods for moving said brake elements in said opposite direction for releasing the brakes, and a slot connecting each of said openings to the outer periphery of the respective brake elements, said slots providing for application and removal of said rods to and from said aligned openings.

12. A brake mechanism comprising in combination, an annular relatively fixed member, a plurality of coaxially aligned annular brake elements disposed at one side of said member and movable axially in one direction relative to said member to effect an application of brakes and in the opposite direction a release of brakes, a plurality of rods spaced apart from each other in a circle coaxial with said brake elements and extending in the direction parallel to the axis of said brake elements, each rod extending through aligned openings in the several brake elements, a release member secured to each rod for contact with each brake element for moving same in said opposite direction for releasing the brakes, spring means carried by said fixed member and acting on said rods for moving said brake elements in said opposite direction for releasing the brakes, and a slot connecting each of said openings to the outer periphery of the respective brake elements, said slots providing for application and removal of said rods to and from said aligned openings, one of said brake elements being provided with recesses to receive the respective release members on said rods and said spring means urging such release members into said recesses for securing said rods against movement out of said openings and slots.

13. A brake mechanism comprising in combination, a relatively fixed annular member, a plurality of annular brake elements carried by and arranged in coaxial relation with said member and movable in a direction away from said member for effecting an application of brakes and in the direction of said member into spaced apart relation for effecting a release of brakes, stop means engageable by said brake elements for defining said spaced apart relation, brake cylinder means carried by said annular member operative by fluid under pressure for actuating said brake elements in the direction away from said member, and a plurality of flat spiral springs equally spaced from each other around said annular member and carried thereby and having one end secured to said member, and means connecting the opposite end of each of said springs to each of said brake elements for rendering all of said springs effective to urge said brake elements in the direction of said annular member and into contact with said stop means and providing for movement of said brake elements in the opposite direction by said brake cylinder means.

14. A brake mechanism comprising in combination, a relatively fixed annular member, a plurality of annular brake elements carried by and arranged in coaxial relation with said member and movable in a direction away from said member for effecting an application of brakes and in the direction of said member into spaced apart relation for effecting a release of brakes, stop means engageable by said brake elements for defining said spaced apart relation, a plurality of brake cylinders spaced from each other around and carried by said annular member for operation by fluid under pressure to effect movement of said brake elements in the direction away from said annular member, and a flat spiral spring carried by said annular member between each two adjacent brake cylinders, means anchoring one end of each of said springs to said annular member, and means connecting the opposite end of each of said springs to said brake elements for rendering each spring effective to urge said brake elements in the direction of said annular member into contact with said stops and providing for movement of said brake elements in the direction away from said annular member by said brake cylinder means.

15. A brake mechanism comprising in combination a relatively fixed annular member, a plurality of annular brake elements at one side of said member arranged in coaxial relation with said member and carried thereby, brake cylinder means carried by said annular member comprising a cylinder and a reciprocatory piston therein, a rod connecting said piston to the adjacent brake element, said piston being operative by fluid under pressure for moving said brake elements axially in a direction away from said annular member to effect an application of brakes, the release of fluid under pressure from said cylinder providing for movement of said brake elements in the direction of said annular member to brake release positions, engagement between said piston and cylinder being arranged to define the release position of the brake element adjacent said annular member, stops engageable by the other brake elements for defining their release positions, and flat spiral spring means carried by said annular member and having one end anchored thereto, and means connecting the opposite end of said spring means to said brake elements for rendering said spring means effective for moving the several brake elements to their release positions.

16. A brake mechanism comprising in combination, a relatively fixed annular member, an annular brake element arranged in coaxial relation with said fixed member and operative upon movement in a direction away from said member to effect an application of brakes and upon movement in the direction of said member to effect a release of brakes, brake cylinder means carried by said member and connected to said brake element for operation by fluid under pressure to effect movement of said brake element in the direction away from said member, a plurality of pins spaced from each other around one side of said fixed member and arranged with their axes at right angles to the axis of said fixed member, means associated with said fixed member providing journaled connections for said pins, a flat spiral spring carried by each of said pins and having one end anchored thereto, means connecting the opposite end of said springs to said brake element, and means associated with each of said pins operative to turn same and thereby place the respective spring under tension for pulling said brake element in the direction of said fixed member, and means for securing each of said pins in an adjusted condition.

GEORGE K. NEWELL.